(12) United States Patent
Freiheit

(10) Patent No.: US 11,862,028 B2
(45) Date of Patent: *Jan. 2, 2024

(54) SYSTEM AND METHOD FOR PILOT ASSISTANCE IN AN ELECTRIC AIRCRAFT

(71) Applicant: BETA AIR, LLC, South Burlington, VT (US)

(72) Inventor: Collin Freiheit, Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/843,749

(22) Filed: Jun. 17, 2022

(65) Prior Publication Data

US 2023/0054642 A1    Feb. 23, 2023

Related U.S. Application Data

(63) Continuation of application No. 17/406,204, filed on Aug. 19, 2021, now Pat. No. 11,417,224.

(51) Int. Cl.
| | |
|---|---|
| *G08G 5/00* | (2006.01) |
| *B64C 39/02* | (2023.01) |
| *B64D 45/00* | (2006.01) |
| *G06N 3/08* | (2023.01) |
| *B64C 29/00* | (2006.01) |
| *B64U 50/19* | (2023.01) |

(52) U.S. Cl.
CPC .......... *G08G 5/0069* (2013.01); *B64C 29/00* (2013.01); *B64C 39/024* (2013.01); *B64D 45/00* (2013.01); *G06N 3/08* (2013.01); *G08G 5/0065* (2013.01); *B64U 50/19* (2023.01); *B64U 2201/20* (2023.01)

(58) Field of Classification Search
CPC .. G08G 5/0069; G08G 5/0065; G08G 5/0021; G08G 5/0086; B64C 29/00; B64C 39/024; B64C 13/04; B64D 45/00; B64D 31/02; G06N 3/08; G06N 20/10; B64U 50/19; B64U 2201/20

See application file for complete search history.

(56) References Cited

U.S. PATENT DOCUMENTS

| | | | |
|---|---|---|---|
| 10,768,639 B1 * | 9/2020 | Meisenholder | .......... G05D 1/12 |
| 11,208,200 B1 * | 12/2021 | Auerbach | ............ G05D 1/0077 |
| 11,407,496 B1 * | 8/2022 | Auerbach | ................. B64C 9/00 |
| 11,411,474 B1 * | 8/2022 | White | .................... H02K 11/27 |
| 11,417,154 B1 * | 8/2022 | Moeykens | .............. G06F 21/31 |

(Continued)

FOREIGN PATENT DOCUMENTS

| | | | | |
|---|---|---|---|---|
| WO | WO-2017035590 A1 * | 3/2017 | .......... | B64C 39/024 |
| WO | WO-2023044173 A2 * | 3/2023 | ............. | B64D 27/24 |

*Primary Examiner* — Yonel Beaulieu
(74) *Attorney, Agent, or Firm* — CALDWELL INTELLECTUAL PROPERTY LAW

(57) ABSTRACT

A system and method for pilot assistance in an electric vertical takeoff and landing (eVTOL) aircraft. The system generally includes a pilot control and a flight controller. The pilot control is attached to the eVTOL aircraft. The pilot control is configured to transmit an input relating to the flight path of the aircraft. The flight controller is communicatively connected to the pilot control. The flight controller is configured to receive the input relating to the flight path, generate an output of a recommended flight maneuver as a function of the input, and display the recommended flight maneuver.

20 Claims, 7 Drawing Sheets

(56) References Cited

U.S. PATENT DOCUMENTS

| | | | |
|---|---|---|---|
| 11,417,224 B1* | 8/2022 | Freiheit | B64C 13/04 |
| 11,420,756 B1* | 8/2022 | Moy | H02P 29/024 |
| 11,542,003 B1* | 1/2023 | Moy | B64C 19/00 |
| 11,561,558 B1* | 1/2023 | Freiheit | G05D 1/0858 |
| 11,562,653 B1* | 1/2023 | Foland | G08G 5/0069 |
| 11,584,542 B1* | 2/2023 | Moy | B64D 45/00 |
| 2019/0189017 A1* | 6/2019 | Nicholls | G08G 5/0078 |
| 2019/0340933 A1* | 11/2019 | Villa | B64C 29/0016 |
| 2020/0241575 A1* | 7/2020 | Meisenholder | G10L 15/24 |
| 2022/0156083 A1* | 5/2022 | Neumann | G06F 9/3853 |
| 2022/0266988 A1* | 8/2022 | Richter | B64D 31/06 |
| 2022/0317706 A1* | 10/2022 | Moy | G05D 1/0825 |
| 2023/0053491 A1* | 2/2023 | Moeykens | G08G 5/0091 |
| 2023/0088506 A1* | 3/2023 | Wiegman | B64D 45/00 701/3 |
| 2023/0103208 A1* | 3/2023 | Adeli-Nadjafi | G06N 5/048 709/226 |

\* cited by examiner

SYSTEM AND METHOD FOR PILOT ASSISTANCE IN AN ELECTRIC AIRCRAFT

CROSS-REFERENCE TO RELATED APPLICATIONS

This application is a continuation of Nonprovisional application Ser. No. 17/406,204, filed on Aug. 19, 2021, and entitled "SYSTEM AND METHOD FOR PILOT ASSISTANCE IN AN ELECTRIC AIRCRAFT," now U.S. Pat. No. 11,417,224, the entirety of which is incorporated herein by reference.

FIELD OF THE INVENTION

The present invention generally relates to the field of electric aircraft. In particular, the present invention is directed to a system and method for pilot assistance in an electric vertical takeoff and landing (eVTOL) aircraft.

BACKGROUND

A pilot controlling the eVTOL aircraft alone can be complicated due to the different modes of flight and a pilot's inability to predict the flight path. This can cause issues with the safety of the flight.

SUMMARY OF THE DISCLOSURE

In an aspect, a system and method for pilot assists of an electric aircraft is provided. The system includes a pilot control attached to an electric aircraft and a flight controller communicatively connected to the pilot control. The flight controller is configured to receive an input from the pilot control. The flight controller is configured to generate an output of a recommended maneuver as a function of the input. The flight controller is configured to transmit the output of the recommended maneuver to a remote device. The flight controller is configured to control an electric propulsor of the electric aircraft as a function of the output of the recommended maneuver, where the electric propulsor is configured to propel the electric aircraft.

In another aspect, a method for pilot assist of an electric aircraft is provided. The method includes receiving, at a flight controller, an input from a pilot control of an electric aircraft that is communicatively connected to the flight controller. The method includes generating, at the flight controller, an output of a recommended maneuver as a function of the input. The method includes transmitting, at the flight controller, the output of the recommended maneuver to a remote device. The method includes controlling, at the flight controller, a propulsor of the electric aircraft as a function of the output of the recommended maneuver.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. The implementations described below are exemplary implementations provided to enable persons skilled in the art to make or use embodiments of the disclosure and are not intended to limit the scope of the disclosure, which is defined by the claims. For purposes of description herein, the terms "upper", "lower", "left", "rear", "right", "front", "vertical", "horizontal", "upward", "downward", "forward", "backward" and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At a high level, aspects of the present disclosure are directed to systems and methods for pilot assists. In an embodiment, systems and methods are provided for pilot assists of an electric vertical takeoff and landing (eVTOL) aircraft. Aspects of the present disclosure can be used to provide a pilot assist system the produces a recommended maneuver. This is so, at least in part, because an aircraft flight controller is configured to receive an input and generate an output on a display. Aspects of the present disclosure advantageously allow for a smooth and safe flight by assisting the pilot. Exemplary embodiments illustrating aspects of the present disclosure are described below in the context of several specific examples.

Figure 1:
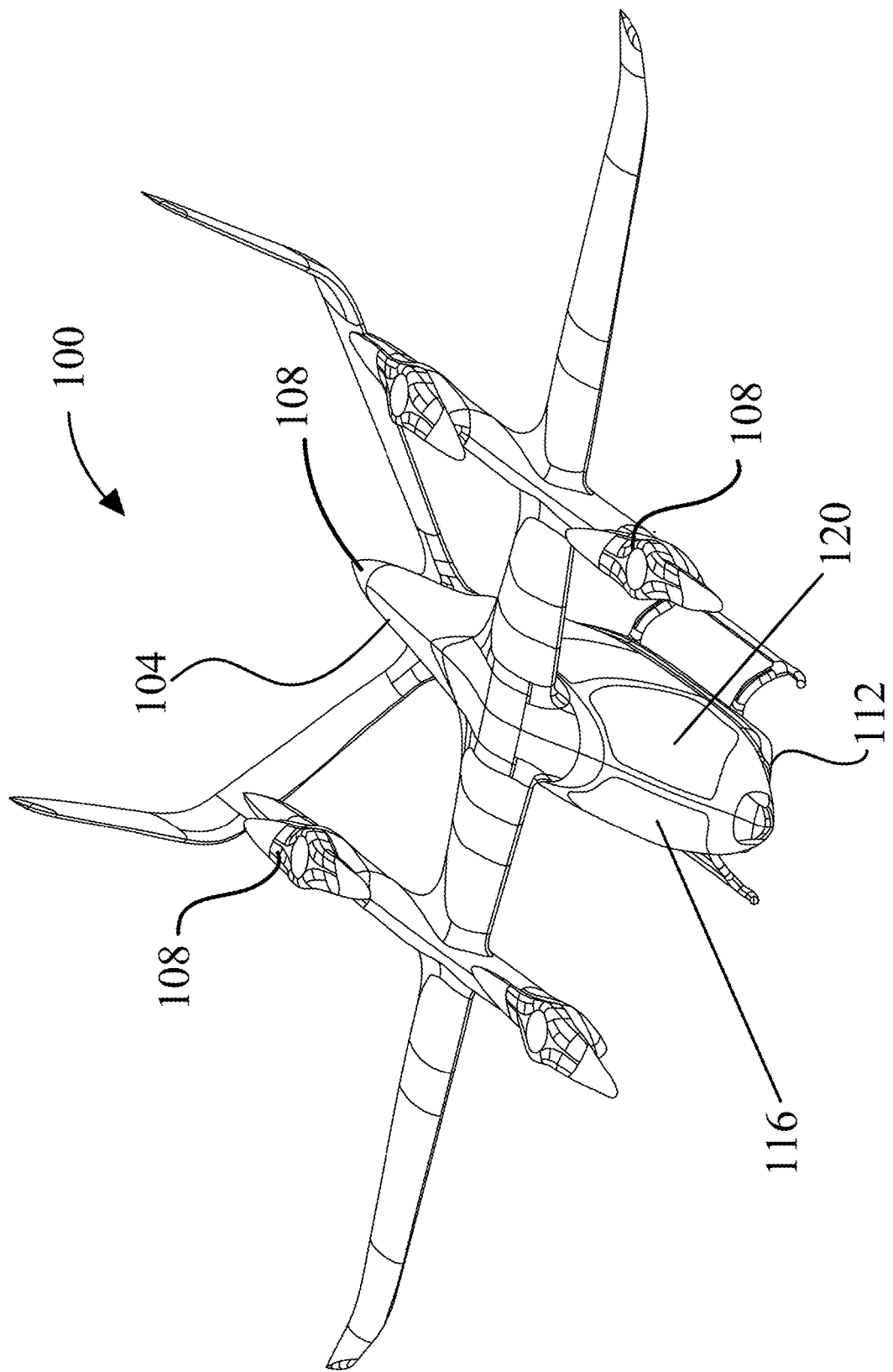
FIG. 1 is a diagrammatic representation of an exemplary embodiment of an electric aircraft.

Referring now to FIG. 1, an exemplary embodiment of an aircraft 100 including a system for flight control is illustrated. In an embodiment, aircraft 100 is an electric vertical takeoff and landing (eVTOL) aircraft. As used in this disclosure an "aircraft" is any vehicle that may fly by gaining support from the air. As a non-limiting example, aircraft may include airplanes, helicopters, commercial and/or recreational aircrafts, instrument flight aircrafts, drones, electric aircrafts, airliners, rotorcrafts, vertical takeoff and landing aircrafts, jets, airships, blimps, gliders, paramotors, and the like. Aircraft 100 may include an electrically powered aircraft. In embodiments, electrically powered aircraft may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof. Electric aircraft may include one or more manned and/or unmanned aircrafts. Electric aircraft may include one or more all-electric short takeoff and landing (eSTOL) aircrafts. For example, and without limitation, eSTOL aircrafts may accelerate the plane to a flight speed on takeoff and decelerate plane after landing. In an embodiment, and without limitation, electric aircraft may be configured with an electric propulsion assembly. Electric propulsion assembly may include any electric propulsion assembly as described in U.S. Nonprovisional application Ser. No. 16/703,225, filed on Dec. 4, 2019, and entitled "AN INTEGRATED ELECTRIC PROPULSION ASSEMBLY," the entirety of which is incorporated herein by reference. Aircraft may also include, without limitation, a drone. In this disclosure, "drone" may be defined as an aircraft without a human pilot or crew and uses aerodynamic forces to provide vehicle lift; a drone may also be known as an unmanned aerial vehicle (UAV).

Still referring to FIG. 1, aircraft 100 can include a fuselage 104, a flight component 108 (or one or more flight components 108), a flight controller 112, a pilot control 116, a remote device 208, and/or any combination thereof.

As used in this disclosure, a vertical take-off and landing (VTOL) aircraft is an aircraft that can hover, take off, and land vertically. An eVTOL, as used in this disclosure, is an electrically powered aircraft typically using an energy source, of a plurality of energy sources to power the aircraft. To optimize the power and energy necessary to propel aircraft 100, eVTOL may be capable of rotor-based cruising flight, rotor-based takeoff, rotor-based landing, fixed-wing cruising flight, airplane-style takeoff, airplane style landing, and/or any combination thereof. Rotor-based flight, as described herein, is where aircraft generates lift and propulsion by way of one or more powered rotors or blades coupled with an engine, such as a "quad copter," multi-rotor helicopter, or other vehicle that maintains its lift primarily using downward thrusting propulsors. "Fixed-wing flight", as described herein, is where aircraft is capable of flight using wings and/or foils that generate lift caused by the aircraft's forward airspeed and the shape of the wings and/or foils, such as airplane-style flight.

Still referring to FIG. 1, as used in this disclosure a "fuselage" is a main body of an aircraft, or in other words, the entirety of aircraft 100 except for a cockpit, nose, wings, empennage, nacelles, any and all control surfaces, and generally contains an aircraft's payload. Fuselage 104 may include structural elements that physically support a shape and structure of an aircraft. Structural elements may take a plurality of forms, alone or in combination with other types. Structural elements may vary depending on a construction type of aircraft such as without limitation a fuselage 104.

Fuselage 104 may comprise a truss structure. A truss structure may be used with a lightweight aircraft and comprises welded steel tube trusses. A "truss," as used in this disclosure, is an assembly of beams that create a rigid structure, often in combinations of triangles to create three-dimensional shapes. A truss structure may alternatively comprise wood construction in place of steel tubes, or a combination thereof. In embodiments, structural elements may comprise steel tubes and/or wood beams. In an embodiment, and without limitation, structural elements may include an aircraft skin. Aircraft skin may be layered over the body shape constructed by trusses. Aircraft skin may comprise a plurality of materials such as plywood sheets, aluminum, fiberglass, and/or carbon fiber, the latter of which will be addressed in greater detail later herein.

In embodiments, and with continued reference to FIG. 1, aircraft fuselage 104 may include and/or be constructed using geodesic construction. Geodesic structural elements may include stringers wound about formers (which may be alternatively called station frames) in opposing spiral directions. A "stringer," as used in this disclosure, is a general structural element that may include a long, thin, and rigid strip of metal or wood that is mechanically coupled to and spans a distance from, station frame to station frame to create an internal skeleton on which to mechanically couple aircraft skin. A former (or station frame) may include a rigid structural element that is disposed along a length of an interior of aircraft fuselage 104 orthogonal to a longitudinal (nose to tail) axis of aircraft and may form a general shape of fuselage 104. A former may include differing cross-sectional shapes at differing locations along fuselage 104, as the former is the structural element that informs the overall shape of a fuselage 104 curvature. In embodiments, aircraft skin may be anchored to formers and strings such that the outer mold line of a volume encapsulated by formers and stringers comprises the same shape as aircraft 100 when installed. In other words, former(s) may form a fuselage's ribs, and the stringers may form the interstitials between such ribs. The spiral orientation of stringers about formers may provide uniform robustness at any point on an aircraft fuselage such that if a portion sustains damage, another portion may remain largely unaffected. Aircraft skin may be attached to underlying stringers and formers and may interact with a fluid, such as air, to generate lift and perform maneuvers.

In an embodiment, and still referring to FIG. 1, fuselage 104 may include and/or be constructed using monocoque construction. Monocoque construction may include a primary structure that forms a shell (or skin in an aircraft's case) and supports physical loads. Monocoque fuselages are fuselages in which aircraft skin or shell is also the primary structure. In monocoque construction aircraft skin would support tensile and compressive loads within itself and true monocoque aircraft can be further characterized by the absence of internal structural elements. Aircraft skin in this construction method is rigid and can sustain its shape with no structural assistance form underlying skeleton-like elements. Monocoque fuselage may comprise aircraft skin made from plywood layered in varying grain directions, epoxy-impregnated fiberglass, carbon fiber, or any combination thereof.

According to embodiments, and further referring to FIG. 1, fuselage 104 may include a semi-monocoque construction. Semi-monocoque construction, as used herein, is a partial monocoque construction, wherein a monocoque construction is describe above detail. In semi-monocoque construction, aircraft fuselage 104 may derive some structural support from stressed aircraft skin and some structural support from underlying frame structure made of structural elements. Formers or station frames can be seen running transverse to the long axis of fuselage 104 with circular cutouts which are generally used in real-world manufacturing for weight savings and for the routing of electrical harnesses and other modern on-board systems. In a semi-monocoque construction, stringers are thin, long strips of material that run parallel to fuselage's long axis. Stringers may be mechanically coupled to formers permanently, such as with rivets. Aircraft skin may be mechanically coupled to stringers and formers permanently, such as by rivets as well. A person of ordinary skill in the art will appreciate, upon reviewing the entirety of this disclosure, that there are numerous methods for mechanical fastening of components like screws, nails, dowels, pins, anchors, adhesives like glue or epoxy, or bolts and nuts, to name a few. A subset of fuselage under the umbrella of semi-monocoque construction includes unibody vehicles. Unibody, which is short for "unitized body" or alternatively "unitary construction", vehicles are characterized by a construction in which the body, floor plan, and chassis form a single structure. In the aircraft world, unibody may be characterized by internal structural elements like formers and stringers being constructed in one piece, integral to aircraft skin as well as any floor construction like a deck.

Still referring to FIG. 1, stringers and formers, which may account for the bulk of an aircraft structure excluding monocoque construction, may be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin will be transferred to stringers. A location of said stringers greatly informs the type of forces and loads applied to each and every stringer, all of which may be handled by material selection, cross-sectional area, and mechanical coupling methods of each member. A similar assessment may be made for formers. In general, formers may be significantly larger in cross-sectional area and thickness, depending on location, than stringers. Both stringers and formers may comprise aluminum, aluminum alloys, graphite epoxy composite, steel alloys, titanium, or an undisclosed material alone or in combination.

In an embodiment, and still referring to FIG. 1, stressed skin, when used in semi-monocoque construction is the concept where the skin of an aircraft bears partial, yet significant, load in an overall structural hierarchy. In other words, an internal structure, whether it be a frame of welded tubes, formers and stringers, or some combination, may not be sufficiently strong enough by design to bear all loads. The concept of stressed skin may be applied in monocoque and semi-monocoque construction methods of fuselage 104. Monocoque comprises only structural skin, and in that sense, aircraft skin undergoes stress by applied aerodynamic fluids imparted by the fluid. Stress as used in continuum mechanics may be described in pound-force per square inch (lbf/in$^2$) or Pascals (Pa). In semi-monocoque construction stressed skin may bear part of aerodynamic loads and additionally may impart force on an underlying structure of stringers and formers.

Still referring to FIG. 1, it should be noted that an illustrative embodiment is presented only, and this disclosure in no way limits the form or construction method of a system and method for loading payload into an eVTOL aircraft. In embodiments, fuselage 104 may be configurable based on the needs of eVTOL per specific mission or objective. The general arrangement of components, structural elements, and hardware associated with storing and/or moving a payload may be added or removed from fuselage 104 as needed, whether it is stowed manually, automatedly, or removed by personnel altogether. Fuselage 104 may be configurable for a plurality of storage options. Bulkheads and dividers may be installed and uninstalled as needed, as well as longitudinal dividers where necessary. Bulkheads and dividers may be installed using integrated slots and hooks, tabs, boss and channel, or hardware like bolts, nuts, screws, nails, clips, pins, and/or dowels, to name a few. Fuselage 104 may also be configurable to accept certain specific cargo containers, or a receptable that can, in turn, accept certain cargo containers.

Still referring to FIG. 1, aircraft 100 may include a plurality of laterally extending elements attached to fuselage 104. As used in this disclosure a "laterally extending element" is an element that projects essentially horizontally from fuselage, including an outrigger, a spar, and/or a fixed wing that extends from fuselage. Wings may be structures which may include airfoils configured to create a pressure differential resulting in lift. Wings may generally dispose on the left and right sides of aircraft symmetrically, at a point between nose and empennage. Wings may comprise a plurality of geometries in planform view, swept swing, tapered, variable wing, triangular, oblong, elliptical, square, among others. A wing's cross section geometry may comprise an airfoil. An "airfoil" as used in this disclosure is a shape specifically designed such that a fluid flowing above and below it exert differing levels of pressure against the top and bottom surface. In embodiments, the bottom surface of an aircraft can be configured to generate a greater pressure than does the top, resulting in lift. Laterally extending element may comprise differing and/or similar cross-sectional geometries over its cord length or the length from wing tip to where wing meets aircraft's body. One or more wings may be symmetrical about aircraft's longitudinal plane, which comprises the longitudinal or roll axis reaching down the center of the aircraft through the nose and empennage, and plane's yaw axis. Laterally extending element may comprise controls surfaces configured to be commanded by a pilot or pilots to change a wing's geometry and therefore its interaction with a fluid medium, like air. Control surfaces may comprise flaps, ailerons, tabs, spoilers, and slats, among others. The control surfaces may dispose on wings in a plurality of locations and arrangements and in embodiments may be disposed at the leading and trailing edges of the wings, and may be configured to deflect up, down, forward, aft, or a combination thereof. An aircraft, including a dual-mode aircraft may comprise a combination of control surfaces to perform maneuvers while flying or on ground.

Still referring to FIG. 1, aircraft 100 may include a plurality of flight components 108. As used in this disclosure a "flight component" is a component that promotes flight and guidance of an aircraft. In an embodiment, flight component 108 may be mechanically coupled to an aircraft. As used herein, a person of ordinary skill in the art would understand "mechanically coupled" to mean that at least a portion of a device, component, or circuit is connected to at least a portion of aircraft via a mechanical coupling. Said mechanical coupling may include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling may be used to connect the ends of adjacent parts and/or objects of an electric aircraft. Further, in an embodiment, mechanical coupling may be used to join two pieces of rotating electric aircraft components.

With continued reference to FIG. 1, in an embodiment, aircraft 100 may include a flight controller 112. As used in this disclosure a "flight controller" is a computing device of a plurality of computing devices dedicated to data storage, security, distribution of traffic for load balancing, and flight instruction. Flight controller 112 may include and/or communicate with any computing device as described in this disclosure, including without limitation a microcontroller, microprocessor, digital signal processor (DSP) and/or system on a chip (SoC) as described in this disclosure. Further, flight controller 112 may include a single computing device operating independently, or may include two or more computing device operating in concert, in parallel, sequentially or the like; two or more computing devices may be included together in a single computing device or in two or more computing devices. In embodiments, flight controller 112 may be installed in an aircraft, may control the aircraft remotely, and/or may include an element installed in the aircraft and a remote element in communication therewith. In an embodiment, and without limitation, flight controller 112 may be configured to command a plurality of flight components, wherein flight components are described in reference to FIG. 1.

Figure 2:
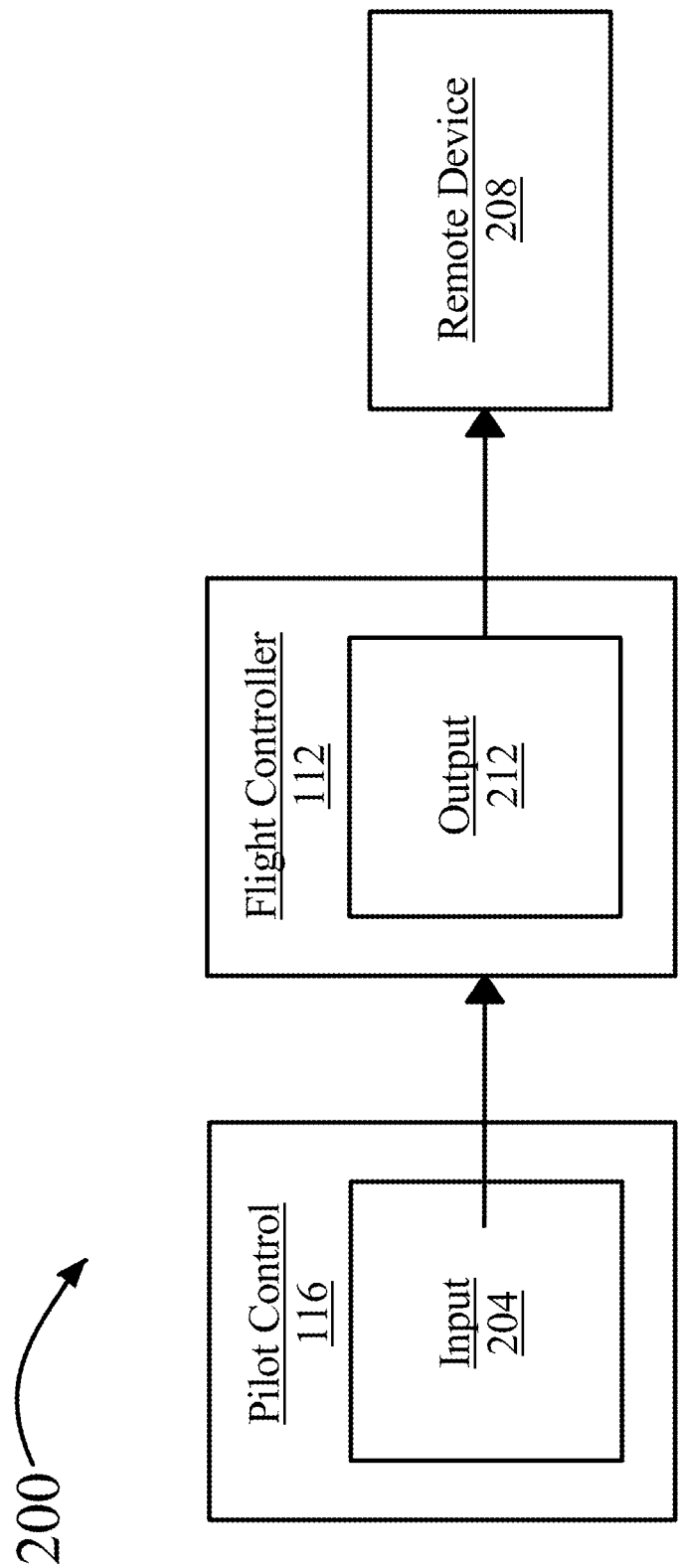
FIG. 2 illustrates a block diagram of an exemplary embodiment of a system for autonomous transition of an electric vertical takeoff and landing (eVTOL) aircraft.

With continued reference to FIG. 1, in an embodiment, aircraft 100 may include pilot control 116, which is further described in reference to FIG. 2.

Referring now to FIG. 2, an exemplary embodiment of a system 200 for pilot assists of an electric vertical takeoff and landing (eVTOL) aircraft. System 200 may include a pilot control 116, remote device 208, and a flight controller 112. Pilot control 116 may be attached to eVTOL aircraft and is configured to transmit input 204 relating to the flight path of the aircraft. Remote device 208 may be attached to eVTOL aircraft and may be configured to display output 212, which is the recommended flight maneuver. Flight controller 112 is configured to receive input 204 from pilot control 116, generate output 212, and show output 212 to pilot via remote device 208.

Referring to FIG. 2, system 200 comprises a flight controller 112. Flight controller 112 may be implemented, without limitation, as described in further details below. In embodiments, flight controller 112 may be installed in an aircraft, may control aircraft remotely, and/or may include an element installed in aircraft and a remote element in communication therewith. Flight controller 112, in an embodiment, is located within fuselage 104 of aircraft. In accordance with some embodiments, flight controller 112 is configured to operate a vertical lift flight (upwards or downwards, that is, takeoff or landing), a fixed wing flight, a transition between a vertical lift flight and a fixed wing flight, and a combination of a vertical lift flight and a fixed wing flight.

Still referring to FIG. 2, in an embodiment, and without limitation, flight controller 112 may be configured to operate aircraft according to a fixed-wing flight capability. A "fixed-wing flight capability," as used in this disclosure, is a method of flight wherein plurality of laterally extending elements generate lift. For example, and without limitation, fixed-wing flight capability may generate lift as a function of an airspeed of aircraft 100 and one or more airfoil shapes of laterally extending elements, wherein an airfoil is described above in detail. As a further non-limiting example, flight controller 112 may operate fixed-wing flight capability as a function of reducing applied torque on lift propulsor component 112. For example, and without limitation, flight controller 112 may reduce a torque of 9 Nm applied to a first set of lift propulsor components to a torque of 2 Nm. As a further non-limiting example, flight controller 112 may reduce a torque of 12 Nm applied to a first set of lift propulsor components to a torque of 0 Nm. In an embodiment, and without limitation, flight controller 112 may produce fixed-wing flight capability as a function of increasing forward thrust exerted by pusher component 116. For example, and without limitation, flight controller 112 may increase a forward thrust of 100 kN produced by pusher component 116 to a forward thrust of 569 kN. In an embodiment, and without limitation, an amount of lift generation may be related to an amount of forward thrust generated to increase airspeed velocity, wherein the amount of lift generation may be directly proportional to the amount of forward thrust produced. Additionally or alternatively, flight controller 112 may include an inertia compensator. As used in this disclosure an "inertia compensator" is one or more computing devices, electrical components, logic circuits, processors, and the like there of that are configured to compensate for inertia in one or more lift propulsor components present in aircraft 100. Inertia compensator may alternatively or additionally include any computing device used as an inertia compensator as described in U.S. Nonprovisional application Ser. No. 17/106,557, filed on Nov. 30, 2020, and entitled "SYSTEM AND METHOD FOR FLIGHT CONTROL IN ELECTRIC AIRCRAFT," the entirety of which is incorporated herein by reference.

In an embodiment, and still referring to FIG. 2, flight controller 112 may be configured to perform a reverse thrust command. As used in this disclosure a "reverse thrust command" is a command to perform a thrust that forces a medium towards the relative air opposing aircraft 100. For example, reverse thrust command may include a thrust of 180 N directed towards the nose of aircraft to at least repel and/or oppose the relative air. Reverse thrust command may alternatively or additionally include any reverse thrust command as described in U.S. Nonprovisional application Ser. No. 17/319,155, filed on May 13, 2021, and entitled "AIRCRAFT HAVING REVERSE THRUST CAPABILITIES," the entirety of which is incorporated herein by reference. In another embodiment, flight controller 112 may be configured to perform a regenerative drag operation. As used in this disclosure a "regenerative drag operation" is an operating condition of an aircraft, wherein aircraft has a negative thrust and/or is reducing in airspeed velocity. For example, and without limitation, regenerative drag operation may include a positive propeller speed and a negative propeller thrust. Regenerative drag operation may alternatively or additionally include any regenerative drag operation as described in U.S. Nonprovisional application Ser. No. 17/319,155.

In an embodiment, and still referring to FIG. 2, flight controller 112 may be configured to perform a corrective action as a function of a failure event. As used in this disclosure a "corrective action" is an action conducted by plurality of flight components to correct and/or alter a movement of an aircraft. For example, and without limitation, a corrective action may include an action to reduce a yaw torque generated by a failure event. Additionally or alternatively, corrective action may include any corrective action as described in U.S. Nonprovisional application Ser. No. 17/222,539, filed on Apr. 5, 2021, and entitled "AIRCRAFT FOR SELF-NEUTRALIZING FLIGHT," the entirety of which is incorporated herein by reference. As used in this disclosure a "failure event" is a failure of a lift component of plurality of lift components. For example, and without limitation, a failure event may denote a rotation degradation of a rotor, a reduced torque of a rotor, and the like thereof. Additionally or alternatively, failure event may include any failure event as described in U.S. Nonprovisional application Ser. No. 17/113,647, filed on Dec. 7, 2020, and entitled "IN-FLIGHT STABILIZATION OF AN AIRCAFT," the entirety of which is incorporated herein by reference.

Still referring to FIG. 2, input 204 may include information relating to flight path of aircraft 100. Output 212 may include information relating to a recommended maneuver as a function of the input. Flight controller 112 may include a computing device. Flight controller may include a proportional-integral-derivative (PID) controller. Flight controller may be configured to increase a rotational speed of pusher component and decrease a rotational speed of lift component.

Still referring to FIG. 2, pilot control 116 is communicative connected to flight controller 112. As used in this disclosure, a "pilot control" is a mechanism or means which allows a pilot to control operation of flight components of an aircraft. For example, and without limitation, pilot control 116 may include a collective, inceptor, foot bake, steering and/or control wheel, control stick, pedals, throttle levers, and the like. Pilot control 116 is configured to translate a pilot's desired torque for each flight component of plurality of flight components, such as and without limitation, a pusher component and a lift component. Pilot control 116 is configured to control, via inputs and/or signals such as from a pilot, the pitch, roll, and yaw of aircraft.

Still referring to FIG. 2, pilot control 116 may include a throttle lever, inceptor stick, collective pitch control, steering wheel, brake pedals, pedal controls, toggles, joystick, and the like. One of ordinary skill in the art, upon reading the entirety of this disclosure would appreciate the variety of pilot input controls that may be present in an electric aircraft consistent with the present disclosure. Inceptor stick may be consistent with disclosure of inceptor stick in U.S. patent application Ser. No. 17/001,845, filed Aug. 25, 2020, and entitled "A HOVER AND THRUST CONTROL ASSEMBLY FOR DUAL-MODE AIRCRAFT", which is incorporated herein by reference in its entirety. Collective pitch control may be consistent with disclosure of collective pitch control in U.S. patent application Ser. No. 16/929,206, filed Jul. 15, 2020, and entitled "HOVER AND THRUST CONTROL ASSEMBLY FOR DUAL-MODE AIRCRAFT", which is incorporated herein by reference in its entirety. Pilot control 116 may also include any of the pilot controls as disclosed in U.S. patent application Ser. No. 17/218,387, filed Mar. 31, 2021, and entitled "METHOD AND SYSTEM FOR FLY-BY-WIRE FLIGHT CONTROL CONFIGURED FOR USE IN ELECTRIC AIRCRAFT," issued as U.S. Pat. No. 11,225,321 on Jan. 18, 2022. Pilot control 116 may be physically located in the cockpit of aircraft or remotely located outside of the aircraft in another location communicatively connected to at least a portion of the aircraft. Pilot control 116 may include buttons, switches, or other binary inputs in addition to, or alternatively than digital controls about which a plurality of inputs may be received. Pilot control 116 may be configured to receive a physical manipulation of a control like a pilot using a hand and arm to push or pull a lever, or a pilot using a finger to manipulate a switch. Pilot control 116 may also be operated by a voice command by a pilot to a microphone and computing system consistent with the entirety of this disclosure. Pilot control 116 may be communicatively connected to any other component presented in system, the communicative connection may include redundant connections configured to safeguard against single-point failure. Pilot control 116 may be incorporated in a simulator located remotely from aircraft. Additionally, pilot control 116 may be overridden by autopilot as an alternate embodiment. In this disclosure, "autopilot" may refer to a device or mechanism that keeps an aircraft on a set course without intervention of the pilot; it also denotes any portion of the flight controller that performs autonomous flight.

Still referring to FIG. 2, pilot control 116 is configured to transmit input 204 to flight controller 112. An "input" as used in this disclosure is an element of data identifying and/or describing the desire of the pilot to follow a flight path. Examples of inputs include but are not limited to ascent of the aircraft after takeoff, descent of the aircraft during landing, and the like, among others. Input 204 may be manually entered by pilot and/or may be obtained from autopilot, or the like. Additionally but not limited to, input 204 may be obtained based on visual cues, tactile cues, flight display, and the like. Input 204 may also be obtained from a pilot who may be located in a simulator controlling aircraft 100 remotely.

Still referring to FIG. 2, flight controller 112, which is communicatively connected, to pilot control 116, is configured to receive input 204 from the pilot control 116. "Communicatively connected," for the purposes of this disclosure, refers to two or more components electrically, or otherwise connected or coupled and configured to transmit and receive signals from one another. Signals may include electrical, electromagnetic, visual, audio, radio waves, combinations thereof, and the like, among others. Flight controller 112 may include any computing device and/or combination of computing devices programmed to operate aircraft.

Still referring to FIG. 2, in an embodiment, flight controller 112 may include a proportional-integral-derivative (PID) controller. Flight controller 112 is configured to receive input 208 from pilot control 116. Flight controller 112 is configured to generate output 212, a recommended flight operation, as a function of the input. Flight controller 112 also is configured to display output 212. The display also may be any type of display or notification. Examples include but aren't limited to audio notifications, visual notifications, tactile feedback, or any combination thereof. Furthermore, more specific examples may include an alarm, a message that pops up on the display, a flash of light, a vibration, or the like.

With continued reference to FIG. 2, flight controller 112 may be configured to identify a specified geographic location as to where aircraft 100 may be located at a particular point in time. Determining location may include a technique for the measuring of distances or slant range from an observer including at least a sensor to a read the aircraft flight path. Technique may include the use of active range finding methods which may include, but not limited to, light detection and ranging (LIDAR), radar, sonar, ultrasonic range finding, and the like. In a non-limiting embodiment, at least sensor may include at least a LIDAR system to measure ranges including variable distances from at least the sensor to a potential flight path. LIDAR systems may include, but not limited to, a laser, at least a phased array, at least a microelectromechanical machine, at least a scanner and/or optic, a photodetector, a specialized GPS receiver, and the like. In a non-limiting embodiment, at least sensor including a LIDAR system may targe an object including the aircrafts' flight path with a laser and measure the time for at least a reflected light to return to the LIDAR system. LIDAR may also be used to make digital 4-D representations of areas on the earth's surface and ocean bottom, due to differences in laser return times, and by varying laser wavelengths. In a non-limiting embodiment the LIDAR system may include a topographic LIDAR and a bathymetric LIDAR, wherein the topographic LIDAR that may use near-infrared laser to map a plot of a land or surface representing a flight path while the bathymetric LIDAR may use water-penetrating green light to measure seafloor and various water level elevations within and/or surrounding the potential flight path. In a non-limiting embodiment, electric aircraft may use at least a LIDAR system as a means of obstacle detection and avoidance to navigate aircraft safely.

Still referring to FIG. 2, in an embodiment, flight controller 112 may be configured to automatically perform flight maneuvers. For example, and without limitation, flight controller may be configured to automatically transition between vertical lift flight and fixed wing flight, as needed or desired. In this disclosure, "automatically" means that flight maneuver data is stored in the flight controller and is preplanned. As used in this disclosure, "vertical lift flight" refers to the substantially vertical, upward, or downward, flight of aircraft. As used in this disclosure, "fixed wing flight" refers to the substantially horizontal, forward, or backward, flight of aircraft. For example but without limitation, flight controller 112 may be configured before the flight to initiate the descent of the plane at a specific time or altitude before landing. In another embodiment, this may be performed manually by the pilot, remote pilot, or fleet manager.

Still referring to FIG. 2, flight controller 112 may include any of the flight controllers as disclosed in U.S. Nonprovisional application Ser. No. 16/929,206, filed on Jul. 15, 2020, entitled "A HOVER AND THRUST CONTROL ASSEMBLY FOR DUAL-MODE AIRCRAFT,", U.S. Nonprovisional application Ser. No. 17/001,845, filed on Aug. 25, 2020, entitled "A HOVER AND THRUST CONTROL ASSEMBLY FOR DUAL-MODE AIRCRAFT,", U.S. Nonprovisional application Ser. No. 17/321,662, filed on May 17, 2021, entitled "AIRCRAFT FOR FIXED PITCH LIFT," issued as U.S. Pat. No. 11,208,206 on Dec. 28, 2021, U.S. Nonprovisional application Ser. No. 17/218,387, filed on Mar. 31, 2021, entitled "METHOD AND SYSTEM FOR FLY-BY-WIRE FLIGHT CONTROL CONFIGURED FOR USE IN ELECTRIC AIRCRAFT," issued as U.S. Pat. No. 11,225,321 on Jan. 18, 2022, and U.S. Nonprovisional application Ser. No. 17/348,851 filed on Jun. 16, 2021, entitled "AIRCRAFT FOR VECTORING A PLURALITY OF PROPULSORS,", the entirety of each one of which is incorporated herein by reference.

Continuing to refer to FIG. 2, in exemplary embodiments, system 200 for flight control of an electric aircraft is based on a pilot-controlled transition from vertical lift flight to fixed wing flight and is directed to how the transition happens with respect to aircraft components and flight controller. One of ordinary skill in the art will recognize that similar mechanisms may be utilized to transition from fixed wing flight to vertical (downward) flight, for example and without limitation, during aircraft's descent for landing. The flight controller is configured to flight controller is configured to identify a geographic location datum. A "geographic location datum" is a piece of data concerning the location of the aircraft, which may include using longitude/latitude, coordinates, directions, and the like.

Still referring to FIG. 2, flight controller 112 may receive training data correlating input to outputs and may train the machine-learning model using that training data. Alternatively, a remote device may train the machine-learning model. Training data may be input by users and/or generated during previous flights. For instance, but without limitation, recording pilot inputs and subsequent pilot inputs when flown by an expert pilot. Training data, machine-learning model, and/or machine-learning algorithms for training machine-learning model may be implemented as described in further detail below.

As used in this disclosure, "flight path angle" is the angle between flight path vector of an aircraft and the horizon. Stated simply, flight path angle can also be described as the climb or descent angle. "Pitch angle" (or pitch attitude), as used in this disclosure, is the angle between longitudinal axis of an aircraft (or component thereof) and the horizon. As used in this disclosure, "angle of attack" is the angle between chord of an airfoil (or component thereof) and relative wind. In other words, it can be approximated as the difference between pitch angle and flight path angle.

Still referring to FIG. 2, remote device 208 is also communicatively connected to flight controller 112. In this disclosure, "remote device" is any visual presentation of data. For example, but without limitation, output 212 may be shown through a sort of computer screen, VR goggles, a tablet, a phone, a gaming device or the like. Other examples may include various types of displays including but not limited to electroluminescent display (ELD), a liquid crystal display (LCD), a light-emitting diode (LED), a plasma display (PDP), and/or a quantum dot display (QLED). Other displays may include a head mounted display, a head-up display, a display incorporated in eyeglasses, googles, headsets, helmet display systems, or the like, a display incorporated in contact lenses, an eye tap display system including without limitation a laser eye tap device, VRD, or the like. When developing remote device 208, it is important to keep in mind that remote device 208 may need to be easily visually accessible by pilot. Remote device 208 may be part of flight controller 112 or pilot control 116 or be a completely separate entity in aircraft. Remote device 208 may also be a stereoscopic display, which may denote a display that simulates a user experience of viewing a three-dimensional space and/or object, for instance by simulating and/or replicating different perspectives of a user's two eyes; this is in contrast to a two-dimensional image, in which images presented to each eye are substantially identical, such as may occur when viewing a flat screen display. Stereoscopic display may display two flat images having different perspectives, each to only one eye, which may simulate the appearance of an object or space as seen from the perspective of that eye. Alternatively or additionally, stereoscopic display may include a three-dimensional display such as a holographic display or the like. Persons skilled in the art, upon reviewing the entirety of this disclosure, will be aware of various optical projection and/or remote device 208 technologies that may be incorporated in system 200 consistently with this disclosure.

Still referring to FIG. 2, flight controller 112 generates output 212 to be shown on remote device 208. When generating the output, flight controller is also configured to receive the input from a user, including an autopilot, and the input as a function of a visual cue. In this disclosure, "user" is anyone that directly interacts and enters an input into the pilot control. Examples of users include but are not limited to a pilot, an autopilot, a pilot controlling aircraft remotely, and the like. In this disclosure, "autopilot" refers to the automatic flight control of the aircraft. Further, as used in this disclosure, "visual cue" is visual notification from the pilot or the like to alert the flight controller of an input. Examples of visual cues include but are not limited to any sort of object, picture, symbols, movement, words, or the like. Additionally, flight controller is also configured to receive input from a simulator device. In this disclosure, "simulator device" refers to a device used to control the aircraft in a simulation rather than real time flight.

Still referring to FIG. 2, output 212 may be a recommended flight maneuver. In this disclosure, "recommended flight maneuver" is an action of movement of an aircraft that is suggested to the pilot from the flight controller. For example, but without limitation, remote device 208 may tell pilot to perform a 180-degree turn. Other examples of flight maneuvers may include straight-and-level flight, climbs, descents, lazy eights, turns, and the like. Recommended maneuver may recommend pilot to follow a particular flight path, what to do next, where to move controls and the like. In this disclosure, "recommended maneuver" may refer to a specific action of flight for the pilot/autopilot to execute. For instance, but without limitation, examples of flight maneuvers may include straight-and-level flight, turns, climbs, and descents.

Figure 3:
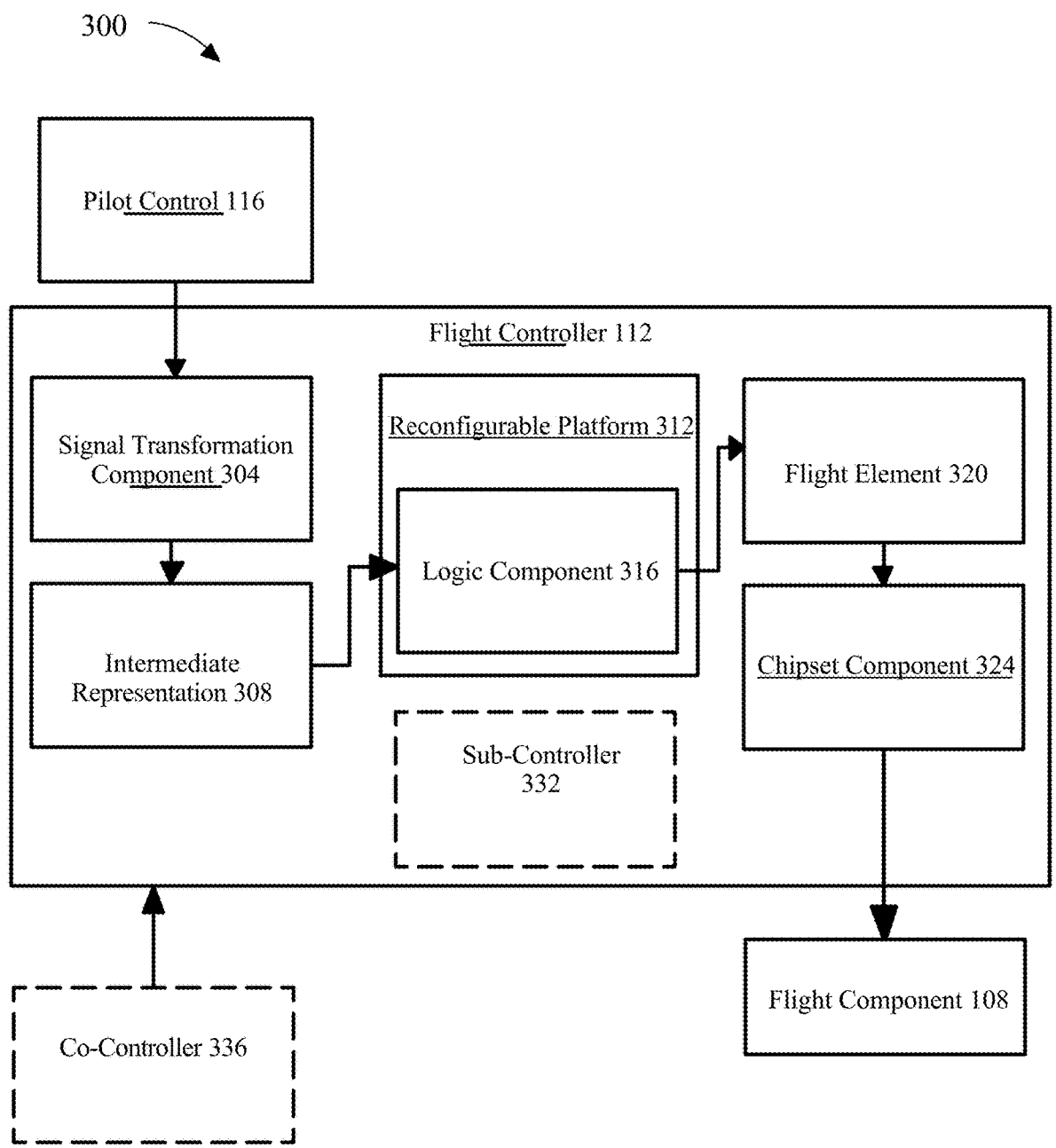
FIG. 3 is a block diagram of an exemplary embodiment of a flight controller.

Now referring to FIG. 3, an exemplary embodiment 300 of a flight controller 112 is illustrated. As used in this disclosure a "flight controller" is a computing device of a plurality of computing devices dedicated to data storage, security, distribution of traffic for load balancing, and flight instruction. Flight controller 112 may include and/or communicate with any computing device as described in this disclosure, including without limitation a microcontroller, microprocessor, digital signal processor (DSP) and/or system on a chip (SoC) as described in this disclosure. Further, flight controller 112 may include a single computing device operating independently, or may include two or more computing device operating in concert, in parallel, sequentially or the like; two or more computing devices may be included together in a single computing device or in two or more computing devices. In embodiments, flight controller 112 may be installed in an aircraft, may control aircraft remotely, and/or may include an element installed in the aircraft and a remote element in communication therewith.

In an embodiment, and still referring to FIG. 3, flight controller 112 may include a signal transformation component 304. As used in this disclosure a "signal transformation component" is a component that transforms and/or converts a first signal to a second signal, wherein a signal may include one or more digital and/or analog signals. For example, and without limitation, signal transformation component 304 may be configured to perform one or more operations such as preprocessing, lexical analysis, parsing, semantic analysis, and the like thereof. In an embodiment, and without limitation, signal transformation component 304 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 304 may include transforming one or more low-level languages such as, but not limited to, machine languages and/or assembly languages. For example, and without limitation, signal transformation component 304 may include transforming a binary language signal to an assembly language signal. In an embodiment, and without limitation, signal transformation component 304 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 3, signal transformation component 304 may be configured to optimize an intermediate representation 308. As used in this disclosure an "intermediate representation" is a data structure and/or code that represents the input signal. Signal transformation component 304 may optimize intermediate representation as a function of a data-flow analysis, dependence analysis, alias analysis, pointer analysis, escape analysis, and the like thereof. In an embodiment, and without limitation, signal transformation component 304 may optimize intermediate representation 308 as a function of one or more inline expansions, dead code eliminations, constant propagation, loop transformations, and/or automatic parallelization functions. In another embodiment, signal transformation component 304 may optimize intermediate representation as a function of a machine dependent optimization such as a peephole optimization, wherein a peephole optimization may rewrite short sequences of code into more efficient sequences of code. Signal transformation component 304 may optimize intermediate representation to generate an output language, wherein an "output language," as used herein, is the native machine language of flight controller 112. For example, and without limitation, native machine language may include one or more binary and/or numerical languages.

In an embodiment, and without limitation, signal transformation component 304 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of $k+1$, and permit correction of $(q-k-1)/2$ erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 3, flight controller 112 may include a reconfigurable hardware platform 312. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 416 may be reconfigured to enact any algorithm and/or algorithm selection process received from another computing device and/or created using machine-learning processes.

Still referring to FIG. 3, reconfigurable hardware platform 312 may include a logic component 316. As used in this disclosure a "logic component" is a component that executes instructions on output language. For example, and without limitation, logic component may perform basic arithmetic, logic, controlling, input/output operations, and the like thereof. Logic component 316 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 316 may be organized according to Von Neumann and/or Harvard architecture as a non-limiting example. Logic component 316 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 316 may include one or more integrated circuit microprocessors, which may contain one or more central processing units, central processors, and/or main processors, on a single metal-oxide-semiconductor chip. Logic component 316 may be configured to execute a sequence of stored instructions to be performed on the output language and/or intermediate representation 308. Logic component 316 may be configured to fetch and/or retrieve the instruction from a memory cache, wherein a "memory cache," as used in this disclosure, is a stored instruction set on flight controller 112. Logic component 316 may be configured to decode the instruction retrieved from the memory cache to opcodes and/or operands. Logic component 316 may be configured to execute the instruction on intermediate representation 308 and/or output language. For example, and without limitation, logic component 316 may be configured to execute an addition operation on intermediate representation 308 and/or output language.

In an embodiment, and without limitation, logic component 316 may be configured to calculate a flight element 320. As used in this disclosure a "flight element" is an element of datum denoting a relative status of aircraft. For example, and without limitation, flight element 320 may denote one or more torques, thrusts, airspeed velocities, forces, altitudes, groundspeed velocities, directions during flight, directions facing, forces, orientations, and the like thereof. For example, and without limitation, flight element 320 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 320 may denote that aircraft is following a flight path accurately and/or sufficiently.

Still referring to FIG. 3, flight controller 112 may include a chipset component 324. As used in this disclosure a "chipset component" is a component that manages data flow. In an embodiment, and without limitation, chipset component 324 may include a northbridge data flow path, wherein the northbridge dataflow path may manage data flow from logic component 316 to a high-speed device and/or component, such as a RAM, graphics controller, and the like thereof. In another embodiment, and without limitation, chipset component 324 may include a southbridge data flow path, wherein the southbridge dataflow path may manage data flow from logic component 316 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 324 may manage data flow between logic component 316, memory cache, and a flight component 108. As used in this disclosure a "flight component" is a portion of an aircraft that can be moved or adjusted to affect one or more flight elements. For example, flight component 108 may include a component used to affect aircrafts' roll and pitch which may comprise one or more ailerons. As a further example, flight component 108 may include a rudder to control yaw of an aircraft. In an embodiment, chipset component 324 may be configured to communicate with a plurality of flight components as a function of flight element 320. For example, and without limitation, chipset component 324 may transmit to an aircraft rotor to reduce torque of a first lift propulsor and increase the forward thrust produced by a pusher component to perform a flight maneuver.

In an embodiment, and still referring to FIG. 3, flight controller 112 may be configured generate an autonomous function. As used in this disclosure an "autonomous function" is a mode and/or function of flight controller 112 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 320. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 112 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 112 will control the ailerons and/or rudders. As used in this disclosure "non-autonomous mode" is a mode that denotes a pilot will control aircraft and/or maneuvers of aircraft in its entirety.

Figure 4:
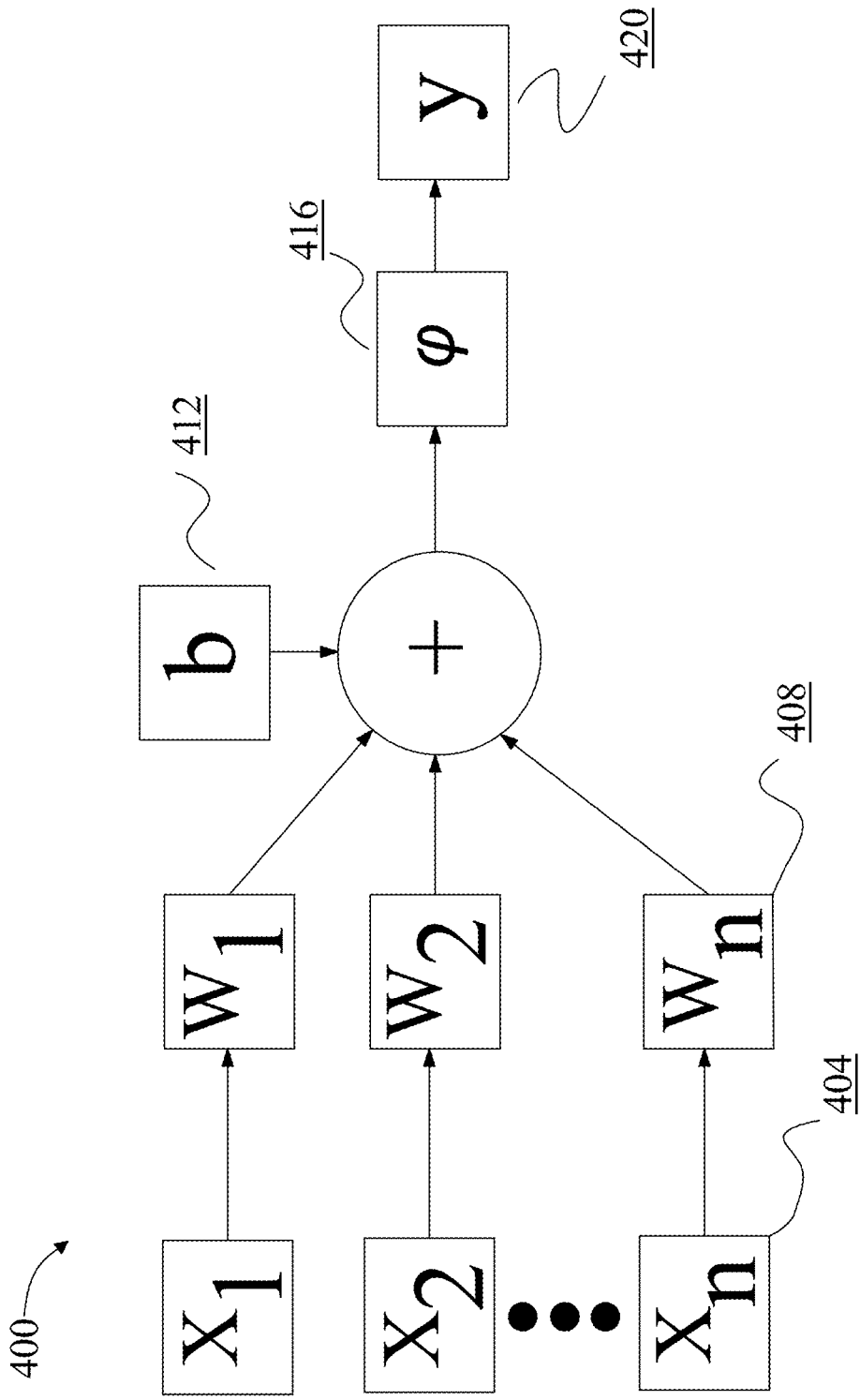
FIG. 4 is a block diagram of an exemplary embodiment of a neural network.

In an embodiment, and still referring to FIG. 3, flight controller 112 generates a machine-learning process which is described in further detail in relation to FIG. 4. Flight controller 112 may generate autonomous function as a function of an autonomous machine-learning model. As used in this disclosure an "autonomous machine-learning model" is a machine-learning model to produce an autonomous function output given flight element 320 and a pilot input signal as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal may denote that a pilot is controlling and/or maneuvering ailerons, wherein the pilot is not in control of the rudders and/or propulsors. In an embodiment, pilot signal 436 may include an implicit signal and/or an explicit signal. For example, and without limitation, pilot signal may include an explicit signal, wherein the pilot explicitly states there is a lack of control and/or desire for autonomous function. As a further non-limiting example, pilot signal may include an explicit signal directing flight controller 112 to control and/or maintain a portion of aircraft, a portion of the flight plan, the entire aircraft, and/or the entire flight plan. As a further non-limiting example, pilot signal may include an implicit signal, wherein flight controller 112 detects a lack of control such as by a malfunction, torque alteration, flight path deviation, and the like thereof. In an embodiment, and without limitation, pilot signal may include one or more explicit signals to reduce torque, and/or one or more implicit signals that torque may be reduced due to reduction of airspeed velocity. In an embodiment, and without limitation, pilot signal may include one or more local and/or global signals. For example, and without limitation, pilot signal may include a local signal that is transmitted by a pilot and/or crew member. As a further non-limiting example, pilot signal may include a global signal that is transmitted by air traffic control and/or one or more remote users that are in communication with pilot of aircraft. In an embodiment, pilot signal may be received as a function of a tri-state bus and/or multiplexor that denotes an explicit pilot signal should be transmitted prior to any implicit or global pilot signal.

Still referring to FIG. 3, autonomous machine-learning model may include one or more autonomous machine-learning processes such as supervised, unsupervised, or reinforcement machine-learning processes that flight controller 112 and/or a remote device may or may not use in the generation of autonomous function. As used in this disclosure "remote device" is an external device to flight controller 112. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 3, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 112 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 3, flight controller 112 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit output to flight controller 112. Remote device and/or FPGA may transmit a signal, bit, datum, or parameter to flight controller 112 that at least relates to autonomous function. Additionally or alternatively, remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, updated machine learning model may be transmitted to remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 112 as a software update, firmware update, or corrected autonomous machine-learning model. For example, and without limitation autonomous machine learning model may utilize a neural net machine-learning process, wherein the updated machine-learning model may incorporate a gradient boosting machine-learning process. Neural net machine-learning process is described in further detail to reference to FIG. 4.

Still referring to FIG. 3, flight controller 112 may include, be included in, and/or communicate with a mobile device such as a mobile telephone or smartphone. Further, flight controller may communicate with one or more additional devices as described below in further detail via a network interface device. Network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 3, flight controller 112 may include, but is not limited to, for example, a cluster of flight controllers in a first location and a second flight controller or cluster of flight controllers in a second location. Flight controller 112 may include one or more flight controllers dedicated to data storage, security, distribution of traffic for load balancing, and the like. Flight controller 112 may be configured to distribute one or more computing tasks as described below across a plurality of flight controllers, which may operate in parallel, in series, redundantly, or in any other manner used for distribution of tasks or memory between computing devices. For example, and without limitation, flight controller 112 may implement a control algorithm to distribute and/or command plurality of flight controllers. As used in this disclosure a "control algorithm" is a finite sequence of well-defined computer implementable instructions that may determine flight component of plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Massachusetts, USA. In an embodiment, and without limitation, control algorithm may be configured to generate an auto-code, wherein an "autocode," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 3, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 108. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, plurality of flight controllers may include a chain path, wherein a "chain path," as used herein, is a linear communication path comprising a hierarchy that data may flow through. In an embodiment, and without limitation, plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 3, plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 112. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 308 and/or output language from logic component 316, wherein output language may include one or more analog-to-digital conversions, low bit rate transmissions, message encryptions, digital signals, binary signals, logic signals, analog signals, and the like thereof described above in detail.

Still referring to FIG. 3, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 3, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between plurality of flight controllers. For example, and without limitation, priority packet may denote that a section of control algorithm should be used and/or is of greater priority than other sections.

Still referring to FIG. 3, flight controller 112 may also be implemented using a "shared nothing" architecture in which data is cached at the worker, in an embodiment, this may enable scalability of aircraft and/or computing device. Flight controller 112 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Neural networks are further discussed in reference to FIG. 4.

Still referring to FIG. 3, flight controller 112 may include a sub-controller 440. As used in this disclosure a "sub-controller" is a controller and/or component that is part of a distributed controller as described above; for instance, flight controller 112 may be and/or include a distributed flight controller made up of one or more sub-controllers. For example, and without limitation, sub-controller 440 may include any controllers and/or components thereof that are similar to distributed flight controller and/or flight controller as described above. Sub-controller 440 may include any component of any flight controller as described above. Sub-controller 440 may be implemented in any manner suitable for implementation of a flight controller as described above. As a further non-limiting example, sub-controller 440 may include one or more processors, logic components and/or computing devices capable of receiving, processing, and/or transmitting data across the distributed flight controller as described above. As a further non-limiting example, sub-controller 440 may include a controller that receives a signal from a first flight controller and/or first distributed flight controller component and transmits the signal to a plurality of additional sub-controllers and/or flight components.

Still referring to FIG. 3, flight controller 112 may include a co-controller 336. As used in this disclosure a "co-controller" is a controller and/or component that joins flight controller 112 as components and/or nodes of a distributer flight controller as described above. For example, and without limitation, co-controller 336 may include one or more controllers and/or components that are similar to flight controller 112. As a further non-limiting example, co-controller 336 may include any controller and/or component that joins flight controller 112 to distributer flight controller. As a further non-limiting example, co-controller 336 may include one or more processors, logic components and/or computing devices capable of receiving, processing, and/or transmitting data to and/or from flight controller 112 to distributed flight control system. Co-controller 336 may include any component of any flight controller as described above. Co-controller 336 may be implemented in any manner suitable for implementation of a flight controller as described above.

In an embodiment, and with continued reference to FIG. 3, flight controller 112 may be designed and/or configured to perform any method, method step, or sequence of method steps in any embodiment described in this disclosure, in any order and with any degree of repetition. For instance, flight controller 112 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Now referring to FIG. 4, diagram 400 shows an example of a neural network. Flight controller 112 generates a machine-learning model that may include a neural network. A "neural network," in this disclosure, is a computer system that endeavors to recognize underlying relationships in a set of data through a process that mimics the way the human brain operates. A node may include, without limitation a plurality of inputs $x_i$ 404 that may receive numerical values from inputs to a neural network containing the node and/or from other nodes. Node may perform a weighted sum of inputs using weights $w_i$ 408 that are multiplied by respective inputs $x_i$ 404. Additionally or alternatively, a bias b 412 may be added to the weighted sum of the inputs such that an offset is added to each unit in the neural network layer that is independent of the input to the layer. The weighted sum may then be input into a function φ 416, which may generate one or more outputs y 420. Weight $w_i$ 408 applied to an input $x_i$ 404 may indicate whether the input is "excitatory," indicating that it has strong influence on the one or more outputs y 420, for instance by the corresponding weight having a large numerical value, and/or a "inhibitory," indicating it has a weak effect influence on the one more input y 420, for instance by the corresponding weight having a small numerical value. The values of weights $w_i$ 408 may be determined by training a neural network using training data, which may be performed using any suitable process as described above. In an embodiment, and without limitation, a neural network may receive semantic units as inputs and output vectors representing such semantic units according to weights $w_i$ 408 that are derived using machine-learning processes as described in this disclosure.

Figure 5:
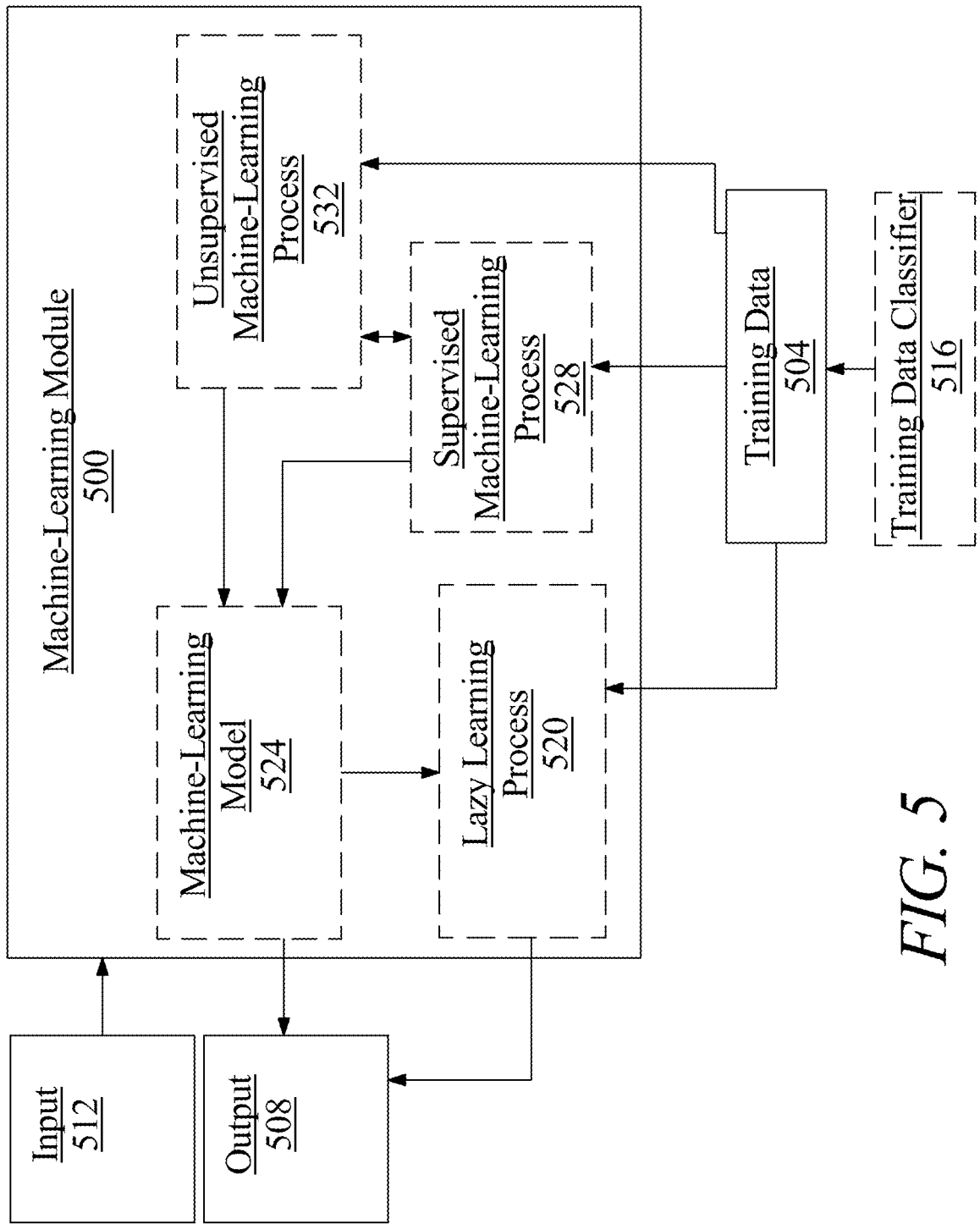
FIG. 5 is a block diagram of an exemplary embodiment of a machine-learning module.

Referring now to FIG. 5, an exemplary embodiment of a machine-learning module 500 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 504 to generate an algorithm that will be performed by a computing device/module to produce outputs 508 given data provided as inputs 512; this is in contrast to a non-machine learning software program where the commands to be executed are determined in advance by a user and written in a programming language.

Still referring to FIG. 5, "training data," as used herein, is data containing correlations that a machine-learning process may use to model relationships between two or more categories of data elements. For instance, and without limitation, training data 504 may include a plurality of data entries, each entry representing a set of data elements that were recorded, received, and/or generated together; data elements may be correlated by shared existence in a given data entry, by proximity in a given data entry, or the like. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 504 to be made applicable for two or more distinct machine-learning algorithms as described in further detail below. Training data 504 used by machine-learning module 500 may correlate any input data as described in this disclosure to any output data as described in this disclosure. As a non-limiting illustrative example flight elements and/or pilot signals may be inputs, wherein an output may be an autonomous function.

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 500 may generate a classifier using a classification algorithm, defined as a process whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 516 may classify elements of training data to sub-categories of flight elements such as torques, forces, thrusts, directions, and the like thereof.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining input and training set to derive the algorithm to be used to produce output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 5, machine-learning processes as described in this disclosure may be used to generate machine-learning models 524. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, machine-learning algorithms may include at least a supervised machine-learning process 528. At least a supervised machine-learning process 528, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

Further referring to FIG. 5, machine learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 6:
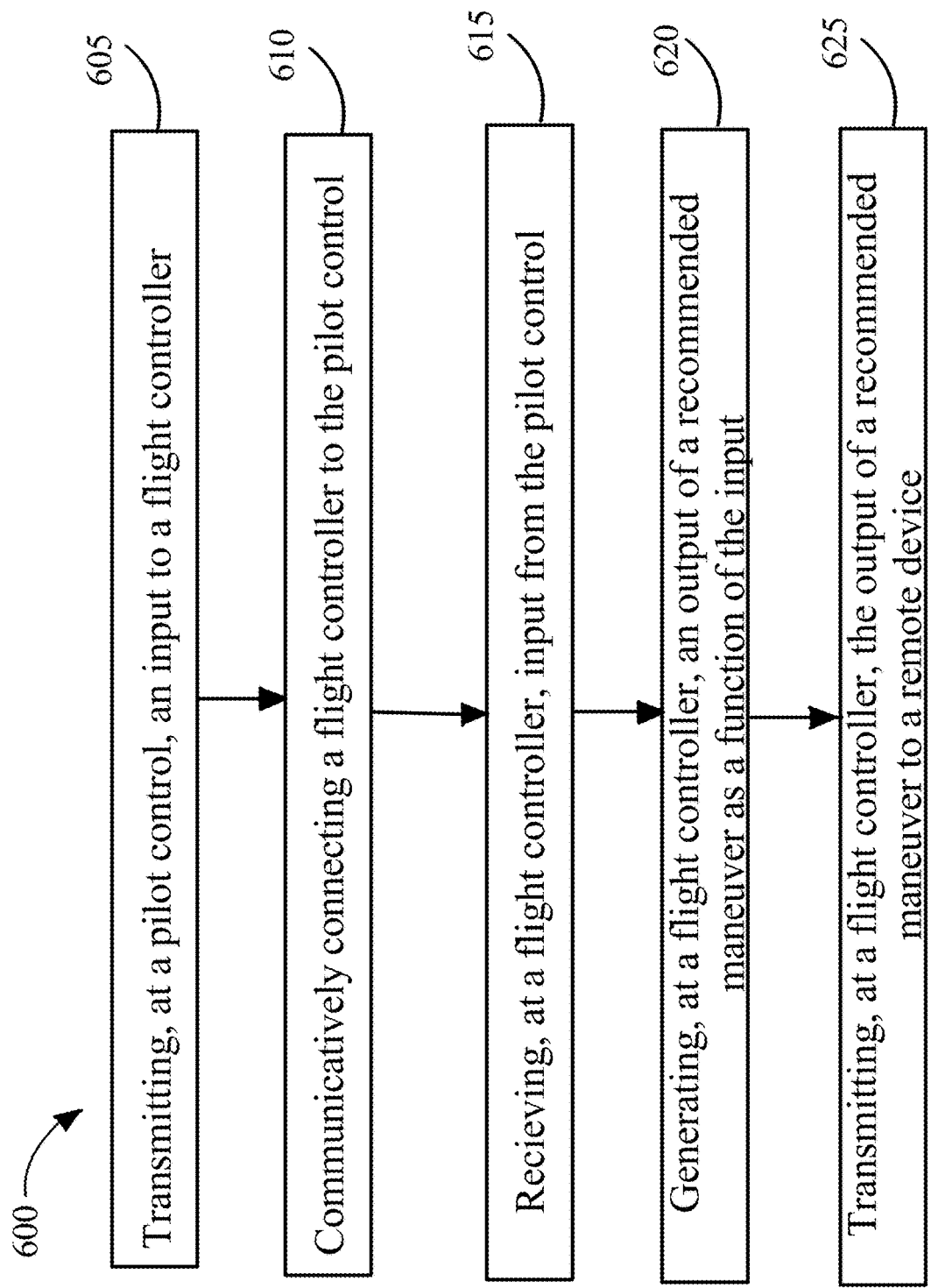
FIG. 6 is a block diagram of an exemplary embodiment of a method for pilot assists of an eVTOL aircraft.

Now referring to FIG. 6, an exemplary embodiment of a method 600 for pilot assists of an eVTOL aircraft. The eVTOL aircraft may include, without limitation, any of aircrafts as disclosed herein and described above with reference to at least FIG. 1.

Still referring to FIG. 6, at step 605, pilot control transmits an input to the flight controller. Pilot control may be any one of the pilot controls as disclosed herein and described above with reference to at least FIG. 1 and FIG. 2. Input may be any one of the inputs as disclosed herein and described above with reference to at least FIG. 2. Flight controller may be any one of flight controllers as disclosed herein and described above with reference to at least FIGS. 1-3.

Still referring to FIG. 6, at step 610, a flight controller is communicatively connected to the pilot control. Flight controller is configured to identify a geographic location datum, which could include using longitude and latitude, degrees, or other types of measurements. Flight controller may be any one of flight controllers as disclosed herein and described above with reference to at least FIGS. 1-3. Pilot control may be any one of the pilot controls as disclosed herein and described above with reference to at least FIG. 1 and FIG. 2.

Still referring to FIG. 6, at step 615, a flight controller receives the input from pilot control. The flight controller is also configured to receive input from a user, autopilot, a function of a visual cue, or a simulation device. Some examples may include but are not limited to a pilot, a robot, a pilot simulator, or a computer. Flight controller may be any one of flight controllers as disclosed herein and described above with reference to at least FIGS. 1-3. Input may be any one of the inputs as disclosed herein and described above with reference to at least FIG. 2. Pilot control may be any one of the pilot controls as disclosed herein and described above with reference to at least FIG. 1 and FIG. 2.

Still referring to FIG. 6, at step 620, the flight controller generates an output of a recommended maneuver as a function of the input. Generating the output further comprises selecting a training set as a function of the input and the electric aircraft, wherein the input is correlated to an element of maneuver data and generating, using a machine-learning model that includes a neural network, an output based on the input and the selected training set. The flight controller is further configured to identify a geographic location datum and use that datum as well as the input to generate the output of a recommended maneuver. Flight controller may be any one of flight controllers as disclosed herein and described above with reference to at least FIGS. 1-3. Output may be any of the outputs as disclosed herein and described above with reference to at least FIG. 2. Input may be any one of the inputs as disclosed herein and described above with reference to at least FIG. 2.

Still referring to FIG. 6, at step 625, the flight controller transmits the output of the recommended flight maneuver to a remote device. Flight controller may be any one of flight controllers as disclosed herein and described above with reference to at least FIGS. 1-3. Output may be any of the outputs as disclosed herein and described above with reference to at least FIG. 2. Remote device may be any of the remote devices as disclosed herein and described above with reference to at least FIG. 2.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
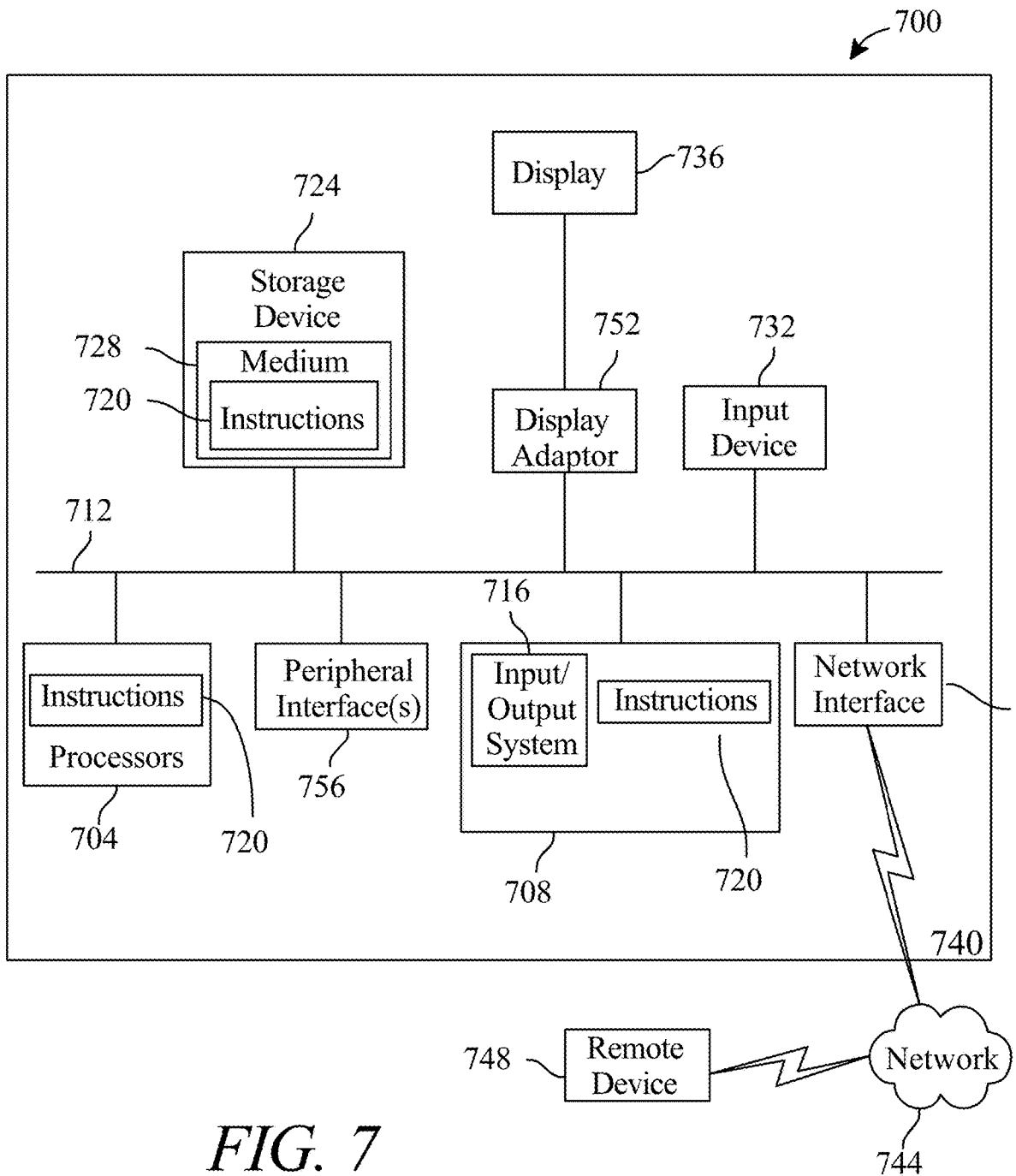
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIRE-WIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve systems and methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for pilot assistance in an electric aircraft, the system comprising:
   a pilot control attached to an electric aircraft; and
   a flight controller communicatively connected to the pilot control, wherein the flight controller is configured to:
      receive an input from the pilot control;
      generate an output of a recommended maneuver as a function of the input;
      transmit the output of the recommended maneuver to a remote device; and
      control an electric propulsor of the electric aircraft as a function of the output of the recommended maneuver, wherein the electric propulsor is configured to propel the electric aircraft.

2. The system of claim 1, wherein the pilot control is operated by a voice command.

3. The system of claim 1, wherein the remote device is configured to display the output of the recommended maneuver to a user of the electric aircraft.

4. The system of claim 1, wherein the electric aircraft comprises a drone.

5. The system of claim 1, wherein the flight controller is further configured to identify a geographic location datum.

6. The system of claim 5, wherein the flight controller is further configured to generate the output of the recommended maneuver as a function of the input and the geographic location datum.

7. The system of claim 1, wherein generating the output of the recommended maneuver further comprises:
   selecting a training set as a function of the input and the electric aircraft, wherein the input is correlated to an element of maneuver data; and
   generating, using a machine-learning model, an output based on the input and the selected training set.

8. The system of claim 7, wherein the machine-learning model includes a neural network machine-learning model.

9. The system of claim 1, wherein the pilot control is configured to receive the input from a user.

10. The system of claim 1, wherein the pilot control comprises a simulator device.

11. A method for pilot assist of an electric aircraft, the method comprising:
    receiving, at a flight controller, an input from a pilot control of an electric aircraft that is communicatively connected to the flight controller;
    generating, at the flight controller, an output of a recommended maneuver as a function of the input;
    transmitting, at the flight controller, the output of the recommended maneuver to a remote device; and
    controlling, at the flight controller, a propulsor of the electric aircraft as a function of the output of the recommended maneuver.

12. The method of claim 11, wherein the pilot control is operated by a voice command.

13. The method of claim 11, wherein the remote device is configured to display the output of the recommended maneuver to a user of the electric aircraft.

14. The method of claim 11, wherein the electric aircraft comprises a drone.

15. The method of claim 11, further comprising identifying, at the flight controller, a geographic location datum.

16. The method of claim 15, further comprising generating, at the flight controller, the output of the recommended maneuver as a function of the input and the geographic location datum.

17. The method of claim 11, wherein generating the output further comprises:
    selecting a training set as a function of the input and the electric aircraft, wherein the input is correlated to an element of maneuver data; and
    generating, using a machine-learning model, an output based on the input and the selected training set.

18. The method of claim 17, wherein the machine-learning model includes a neural network machine-learning model.

19. The method of claim 11, further comprising receiving, at the pilot control, the input from a user.

20. The method of claim 11, wherein the pilot control comprises a simulator device.

* * * * *